United States Patent
Storti

(10) Patent No.: US 10,339,936 B2
(45) Date of Patent: *Jul. 2, 2019

(54) METHOD, DEVICE AND SYSTEM OF ENCODING A DIGITAL INTERACTIVE RESPONSE ACTION IN AN ANALOG BROADCASTING MESSAGE

(71) Applicant: Roland Storti, Mentone (AU)

(72) Inventor: Roland Storti, Mentone (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,724

(22) Filed: Aug. 4, 2017

(65) Prior Publication Data

US 2018/0144750 A1   May 24, 2018

Related U.S. Application Data

(63) Continuation-in-part of application No. 14/092,874, filed on Nov. 27, 2013, now Pat. No. 9,755,770.

(Continued)

(51) Int. Cl.
*G10L 19/00* (2013.01)
*G10L 19/018* (2013.01)
(Continued)

(52) U.S. Cl.
CPC .......... *G10L 19/00* (2013.01); *G06Q 30/0267* (2013.01); *H04B 11/00* (2013.01);
(Continued)

(58) Field of Classification Search
None
See application file for complete search history.

(56) References Cited

U.S. PATENT DOCUMENTS 7,359,889 B2   4/2008 Wang et al.
7,500,007 B2   3/2009 Ikezoye et al.
(Continued)

FOREIGN PATENT DOCUMENTS

CA   2457089 A1   2/2003
CA   2777170 A1   4/2011
(Continued)

OTHER PUBLICATIONS

US Trademark Registration No. 5202534; Mark—MINFO Filing date: Nov. 18, 2014 Publication date: Feb. 28, 2017.

(Continued)

*Primary Examiner* — Thuykhanh Le
(74) *Attorney, Agent, or Firm* — LegalForce RAPC Worldwide

(57) ABSTRACT

Disclosed are a method, a device and a system of generation of a modified digital media file based on a encoding of a digital media file with a decodable data such that the decodable data is indistinguishable through a human ear from a primary audio stream. In one embodiment, a method of an audio encoding system includes validating a user of the audio encoding system as a publisher, associating a response action to a message of the user, the response action is at least one of a call-back action, a web-form action, and a resource-page redirect action using a processor and a memory, generating a unique identifier through a hash function applied to the response action associated with the message of the user, encoding a digital media file associated with the message with a decodable data using the unique identifier such that the decodable data is indistinguishable from a primary audio stream through a human ear, and generating a modified digital media file associated with the digital media file based on the encoding of the message with the decodable data such that the decodable data is indistinguishable from a primary audio stream through the human ear.

20 Claims, 5 Drawing Sheets

Related U.S. Application Data

(60) Provisional application No. 61/730,071, filed on Nov. 27, 2012.

(51) Int. Cl.

| | | |
|---|---|---|
| *G10L 21/04* | (2013.01) | |
| *H04H 20/88* | (2008.01) | |
| *H04H 20/31* | (2008.01) | |
| *H04H 20/93* | (2008.01) | |
| *H04B 11/00* | (2006.01) | |
| *G06Q 30/02* | (2012.01) | |

(52) U.S. Cl.
CPC ............ *H04H 20/31* (2013.01); *H04H 20/88* (2013.01); *H04H 20/93* (2013.01); *G06Q 30/0277* (2013.01); *G10L 19/018* (2013.01); *G10L 21/04* (2013.01); *H04H 2201/37* (2013.01); *H04H 2201/40* (2013.01)

(56) References Cited

U.S. PATENT DOCUMENTS

| | | | |
|---|---|---|---|
| 7,711,564 B2 | 5/2010 | Levy et al. | |
| 7,986,913 B2 | 7/2011 | Wang | |
| 8,015,123 B2 | 9/2011 | Barton et al. | |
| 8,055,364 B2 | 11/2011 | Champion | |
| 8,396,100 B2 | 3/2013 | Corts et al. | |
| 8,464,290 B2 | 6/2013 | Beyda et al. | |
| 8,508,357 B2 | 8/2013 | Srinivasan et al. | |
| 8,595,058 B2 | 11/2013 | Fordyce et al. | |
| 8,688,600 B2 | 4/2014 | Barton et al. | |
| 8,724,436 B2 | 5/2014 | Nathan et al. | |
| 8,843,391 B2 | 9/2014 | Fordyce et al. | |
| 8,885,821 B2 | 11/2014 | Grube et al. | |
| 8,959,366 B2 | 2/2015 | Grube et al. | |
| 9,035,163 B1 | 5/2015 | Mohajer et al. | |
| 9,048,963 B1 | 6/2015 | Paulus et al. | |
| 9,088,626 B2 | 7/2015 | McLane et al. | |
| 9,094,186 B2* | 7/2015 | Cods | H04L 7/04 |
| 9,225,444 B2 | 12/2015 | Wang | |
| 9,253,285 B2 | 2/2016 | McLane et al. | |
| 9,363,856 B2* | 6/2016 | Rutgers | H05B 33/0818 |
| 9,633,371 B1 | 4/2017 | Mohajer et al. | |
| 9,721,287 B2 | 8/2017 | Barton et al. | |
| 2002/0072982 A1 | 6/2002 | Barton et al. | |
| 2003/0009694 A1* | 1/2003 | Wenocur | G06Q 10/107 726/4 |
| 2003/0041110 A1* | 2/2003 | Wenocur | G06Q 10/107 709/206 |
| 2004/0031856 A1* | 2/2004 | Atsmon | G06F 21/34 235/492 |
| 2005/0028189 A1 | 2/2005 | Heine et al. | |
| 2005/0100113 A1* | 5/2005 | Corts | H04H 20/30 375/295 |
| 2005/0267817 A1 | 12/2005 | Barton et al. | |
| 2007/0143777 A1 | 6/2007 | Wang | |
| 2008/0154714 A1* | 6/2008 | Liu | G01C 21/30 705/14.25 |
| 2008/0262928 A1* | 10/2008 | Michaelis | G06Q 30/02 705/14.26 |
| 2009/0012849 A1 | 1/2009 | Penrose Barton et al. | |
| 2009/0150918 A1 | 6/2009 | Wu et al. | |
| 2009/0259325 A1 | 10/2009 | Topchy | |
| 2009/0267895 A1* | 10/2009 | Bunch | G06F 3/0386 345/157 |
| 2011/0054647 A1* | 3/2011 | Chipchase | H04M 3/42127 700/94 |
| 2011/0093327 A1* | 4/2011 | Fordyce, III | G06Q 20/10 705/14.39 |
| 2011/0182424 A1 | 7/2011 | Grube et al. | |
| 2011/0182429 A1 | 7/2011 | Grube et al. | |
| 2011/0185193 A1 | 7/2011 | Grube et al. | |
| 2011/0209213 A1* | 8/2011 | Wooten | G06F 12/14 726/21 |
| 2011/0246284 A1* | 10/2011 | Chaikin | G06Q 20/105 705/14.38 |
| 2011/0313762 A1* | 12/2011 | Ben-David | G10L 13/08 704/231 |
| 2011/0314132 A1 | 12/2011 | Penrose Barton et al. | |
| 2012/0109734 A1 | 5/2012 | Fordyce et al. | |
| 2012/0197981 A1* | 8/2012 | Chan | G06Q 30/0276 709/203 |
| 2012/0278886 A1* | 11/2012 | Luna | G06F 21/552 726/22 |
| 2013/0031600 A1* | 1/2013 | Luna | G06F 21/554 726/1 |
| 2013/0103651 A1* | 4/2013 | Jha | G06F 11/0748 707/687 |
| 2013/0110637 A1* | 5/2013 | Bott | G06F 16/9574 705/14.64 |
| 2014/0007246 A1* | 1/2014 | Nelson | H04L 63/12 726/26 |
| 2014/0029701 A1* | 1/2014 | Newham | H04L 7/041 375/340 |
| 2014/0032677 A1* | 1/2014 | Pittenger | H04L 12/1831 709/205 |
| 2014/0080505 A1* | 3/2014 | Vannucci | G01S 5/0205 455/456.1 |
| 2014/0088975 A1* | 3/2014 | Davis | G08C 23/02 704/500 |
| 2014/0214532 A1 | 7/2014 | Penrose Barton et al. | |
| 2014/0343419 A1 | 11/2014 | Sako et al. | |
| 2014/0351048 A1 | 11/2014 | Fordyce et al. | |
| 2015/0113094 A1 | 4/2015 | Williams et al. | |
| 2015/0146711 A1* | 5/2015 | Corts | H04H 20/30 370/350 |
| 2015/0245431 A1 | 8/2015 | Rutgers et al. | |
| 2015/0295706 A1 | 10/2015 | Corts et al. | |
| 2017/0133022 A1 | 5/2017 | Gurijala et al. | |

FOREIGN PATENT DOCUMENTS

| | | |
|---|---|---|
| CA | 2871916 A1 | 11/2013 |
| CA | 2556552 C | 2/2015 |
| CN | 101802855 A | 8/2010 |
| JP | 2005500736 A | 1/2005 |
| JP | 2007529029 A | 10/2007 |
| JP | 2010525462 A | 7/2010 |
| JP | 2015520979 A | 7/2015 |
| KR | 101381859 B1 | 4/2014 |
| WO | 2002011123 A2 | 2/2002 |
| WO | 2002061652 A2 | 8/2002 |
| WO | 2003009592 A1 | 1/2003 |
| WO | 2003017540 A2 | 2/2003 |
| WO | 2005079499 A2 | 9/2005 |
| WO | 2008042953 A1 | 4/2008 |
| WO | 2008131181 A2 | 10/2008 |
| WO | 2011046667 A2 | 4/2011 |
| WO | 2011140269 A1 | 11/2011 |
| WO | 2012112573 A1 | 8/2012 |
| WO | 2012170353 A1 | 12/2012 |
| WO | 2012170451 A1 | 12/2012 |
| WO | 2013150325 A1 | 10/2013 |
| WO | 2013166158 A1 | 11/2013 |

OTHER PUBLICATIONS

"Minfo official website" by Minfo, Found Online [Jan. 24, 2018] http://www.minfo.com.au/Home.aspx.
"Technology—LISNR" by LISNR, Found Online [Jan. 24, 2018] http://lisnr.com/technology/.
"Coding Transmit data with Chirp technology" by Chirp, Found Online [Jan. 24, 2018] https://www.chirp.io/.
"Shazam official website" by Shazam, Found Online [Jan. 24, 2018] https://www.shazam.com/company.

* cited by examiner

METHOD, DEVICE AND SYSTEM OF ENCODING A DIGITAL INTERACTIVE RESPONSE ACTION IN AN ANALOG BROADCASTING MESSAGE

CLAIMS OF PRIORITY

This patent application is a Continuation-In-Part of, and hereby incorporates by reference the entirety of the disclosures of and claims priority to pending U.S. Non-Provisional application Ser. No. 14/092,874 titled 'METHOD, DEVICE AND SYSTEM OF ENCODING A DIGITAL INTERACTIVE RESPONSE ACTION IN AN ANALOG BROADCASTING MESSAGE' filed on Nov. 27, 2013. This further claims the benefit of the U.S. Provisional patent application No. 61/730,071, titled 'MINFO PLATFORM' filed on Nov. 27, 2012.

FIELD OF TECHNOLOGY

This disclosure relates generally to data processing devices and, more particularly, to a method, a device and/or a system of audio technology, and more particularly to a method, system, and apparatus of generation of a modified digital media file based on a encoding of a digital media file with a decodable data such that the decodable data is indistinguishable through a human ear from a primary audio stream.

BACKGROUND

A mobile device may be able to hear acoustical ranges beyond that of a human ear. However, the mobile device may not be aware of how to interpret the audio data.

A merchant (e.g. a department store, a small shop, a vendor) may wish to communicate advertisements to customers. The merchant may include audible advertisements that speak aloud to customers (e.g. as they pass by in an isle), or may include store-wide sound dispersal of an advertisement (e.g. PA announcements of on sale items). This may annoy customers who may have been otherwise enjoying music or a quiet environment (e.g. a bookstore).

Advertisers already communicating with potential customers through visual or audible mediums (e.g. a television commercial, a radio program, a billboard on the freeway) may not be able to connect with customers because there advertisement does not last long enough for the potential customer to remember brand names or product names, or write down important contact information (e.g. an advertiser's website, phone number, etc.).

During regular programming of entertainment media (e.g. television shows, on-demand movies, online videos, radio programming, etc.) advertisers may not be able to relay their message because it will interrupt the program for some potential customers, even if a few potential customers may want to know who is sponsoring the entertainment media. Therefore, a potentially valuable connection may not form between the advertiser and the customer.

SUMMARY

Disclosed are a method, a device and a system of generation of a modified digital media file based on a encoding of a digital media file with a decodable data such that the decodable data is indistinguishable through a human ear from a primary audio stream.

In one aspect, a method of an audio encoding system includes validating a user of the audio encoding system as a publisher, associating a response action to a message of the user, the response action is at least one of a call-back action, a web-form action, and a resource-page redirect action using a processor and a memory, generating a unique identifier through a hash function applied to the response action associated with the message of the user, encoding a digital media file associated with the message with a decodable data using the unique identifier such that the decodable data is indistinguishable from a primary audio stream through a human ear, and generating a modified digital media file associated with the digital media file based on the encoding of the message with the decodable data such that the decodable data is indistinguishable from a primary audio stream through the human ear.

The decodable data may be an encoded audio stream at an audible frequency or an ultrasound audio stream that may be at an inaudible frequency. The modified digital media file may be communicated from a broadcasting device to a client application of a mobile device as an analog data. The client application may identify the modified digital media file through an analysis of the analog data. The client application may separate the modified digital media file into the digital media file and the decodable data.

The client application may analyze the decodable data using an algorithm that results in a extraction of the unique identifier and the response action associated with the message of the user from the decodable data. The client application may be redirected to an internet protocol address based on the response action. The mobile device may perform the response action comprising the call-back action, the web-form action, and/or the resource-page redirect action based on an instruction at the internet protocol address to which the client application may be redirected. The publisher may be an advertiser, and the message may be an advertisement associated with a promotion offered by the advertiser. In addition, the message an explanation associated with a display a museum or a retail store.

In another aspect method of a mobile device includes analyzing a modified digital media file communicated from a broadcasting device to a client application of the mobile device as an analog data using a processor and a memory of the mobile device, identifying the modified digital media file through the analysis of the analog data, separating the modified digital media file into a digital media file and a decodable data, and analyzing the decodable data using an algorithm that results in a extraction of a unique identifier and a response action associated with a message of a user of an audio encoding system from the decodable data.

In yet another aspect, a system includes an audio encoding system, a broadcasting device, and a mobile device. In this embodiment, the audio encoding system generates a modified digital media file associated with a digital media file based on an encoding a message with a decodable data such that the decodable data is indistinguishable from a primary audio stream through a human ear. In addition, the broadcasting device distributes the modified digital media file. In addition, the mobile device analyzes the decodable data using an algorithm that results in a extraction of a unique identifier and a response action associated with a message of a user of the audio encoding system from the decodable data.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Disclosed are a method, a device and a system of generation of a modified digital media file based on a encoding of a digital media file with a decodable data such that the decodable data is indistinguishable through a human ear from a primary audio stream. Although the present embodiments have been described with reference to specific example embodiments, it will be evident that various modifications and changes may be made to these embodiments without departing from the broader spirit and scope of the various embodiments.

Figure 1:
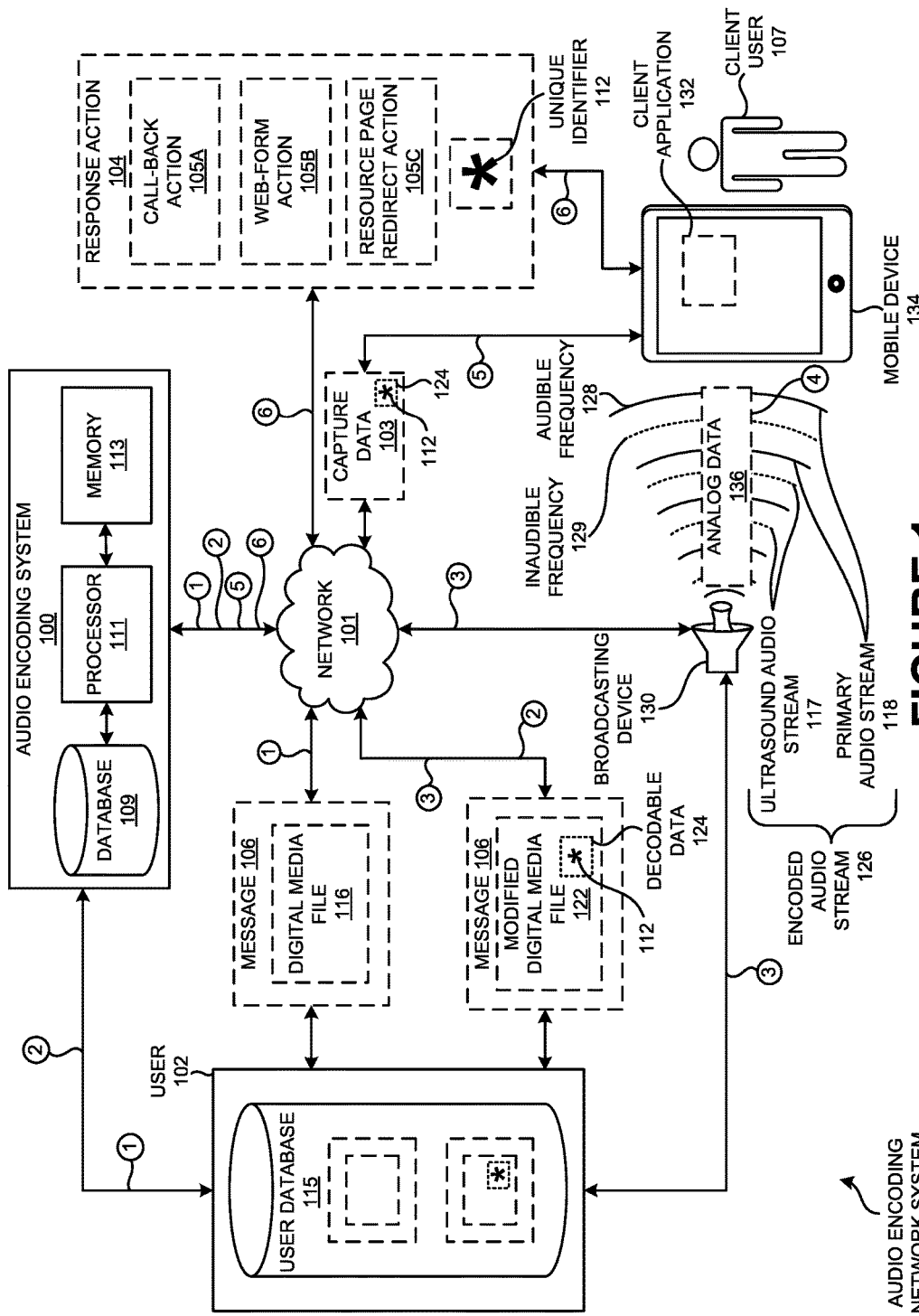
FIG. 1 is a network view illustrating an audio encoding system communicatively coupled with a broadcaster and a mobile device, according to one embodiment.

FIG. 1 is a network view 150 illustrating an audio encoding system communicatively coupled with a broadcaster and a mobile device, according to one embodiment.

Particularly, FIG. 1 illustrates an audio encoding system 100, a network 101, a user 102, a capture data 103, a response action 104, a call-back action 105A, a web-form action 105B, a resource-page redirect action 105C, a message 106, a client user 107, a database 109, a processor 111, a unique identifier 112, a memory 113, user database 115, digital media file 116, ultrasound audio stream 117, primary audio stream 118, modified digital media file 122, decodable data 124, encoded audio stream 126, audible frequency 128, broadcasting device 130, client application 132, mobile device 134, and analog data 136.

The audio encoding system 100 may receive the message 106 in the form of the digital media file 116 from the user 102 along path 'circle 1'. The digital media file 106 may be transmitted to the audio encoding system 100 either through the network 101 (e.g. the internet, local area network) or may be physically delivered to the audio encoding system 100 (e.g. delivered on a flash storage memory, in an external hard drive, etc.). The audio encoding system 100, in a process which will be described in FIG. 2, may then modify the digital media file 116 of the message 106 into the form of a modified digital media file 122 bearing the decodable data 124. The modified digital media file 122 may then be transmitted along path 'circle 2' back to the user 102 where it may be stored in the user database 115. For example, the audio encoding system 100 may send the modified digital media file 122 bearing the decodable data 124 to the user 102 through the network 101 or may be physically delivered.

The user 102 may then play the modified digital media file 122 bearing the decodable data 124 on a broadcasting device 130 (e.g. a loudspeaker, a megaphone, computer speakers, television speakers, an automobile stereo system) by conveying the modified digital media file 122 along path 'circle 3'. For example, the user 102 may effectuate the playing of the modified digital media file 122 on the broadcasting device 130 by transferring the modified digital media file 122 to media stored on a website (e.g., a YouTube® video, a Netflix® video, a sound played in conjunction with an online banner advertisement). Alternatively, the modified digital media file 122 may reach the broadcasting device 130 by being physical transferred to the broadcasting device 130 (e.g., by delivering the modified digital media file 122 a pre-recorded radio or television program to a radio or television network for broadcasting; by burning the modified digital media file 122 onto a compact disk that is played inside a retail store; by integrating the modified digital media file 122 into sound-generating devices not connected to the network 101). The modified digital media file 122 may allow the broadcasting device 130 to play the encoded audio stream 126 which may include the ultrasound audio stream 117 and/or the primary audio stream 118. The ultrasound audio stream 117 may include the inaudible frequency 129 (e.g, be of such high frequency as to be inaudible to the human ear, or be of such low frequency as to be inaudible to the human ear), and the primary audio stream may contain the audible frequency 128. Once played on the broadcasting device 130, the encoded audio stream 126 may create the analogue data 136 along path 'circle 4' which may travel as a set of analogue sound waves in air.

The client user 107 may have the mobile device 134, that uses a processor and a memory, and that may have the client application 132 installed. The client application 132 may analyze the analogue data 136 created by the broadcasting device 130 playing the encoded audio stream 126. The mobile device may create the capture data 103 from both the analogue data 136 (including the decodable data 124 and/or the unique identifier 112) and metadata (e.g., a timestamp, a current geospatial location, a set of past geospatial locations, a set of user preferences, a set of advertising histories) associated with the mobile device 134.

The capture data 103 may move along path 'circle 5' through the network 101 to the audio encoding system 100. In a process that will be described in detail in conjunction with the description of FIG. 3, the audio encoding system 100 may generate the response action 104 which may include a call-back action 105A, a web-form action 105B, a resource page redirect action 105C, and/or a unique identifier 112. The call-back action 105A may be an action to be performed by the client application 132 and/or the mobile device 134 whereby the mobile device 134 may call a phone number associated with the user 102. For example, the call-back action 105A may be a button provided within the user interface of the client application 132 which, when activated by the client user 107 may call a phone number associated with the user 102 (e.g., a sales representative of the user 102, a payment center, a donation service). The web-form action 105B may include a series of data fields that the client user 107 may enter information for submission to the user 102 (e.g. through the network 101). The web-form action 105B may include displaying on the user interface of the mobile device 134 a set of forms within the client application 132 chosen by the user 102 within a browser-based interface that the user 102 may use to set response action 104 parameters within the audio encoding system 100. For example, the web-form action 105B may include presenting the client user 107 with a survey (e.g., asking to questions about the media associated with the encoded audio stream 126, for example to rate its content) or data fields specialized for payment (e.g., for credit card number, credit card expiration, PayPal® information). The resource-page redirect action 105C may include a uniform resource locator (URL) to display a web page (which may be associated with the user 102) within the client application 132 and/or in a browser of the mobile device 134 (e.g. Google Chrome®, Safari®).

Figure 2:
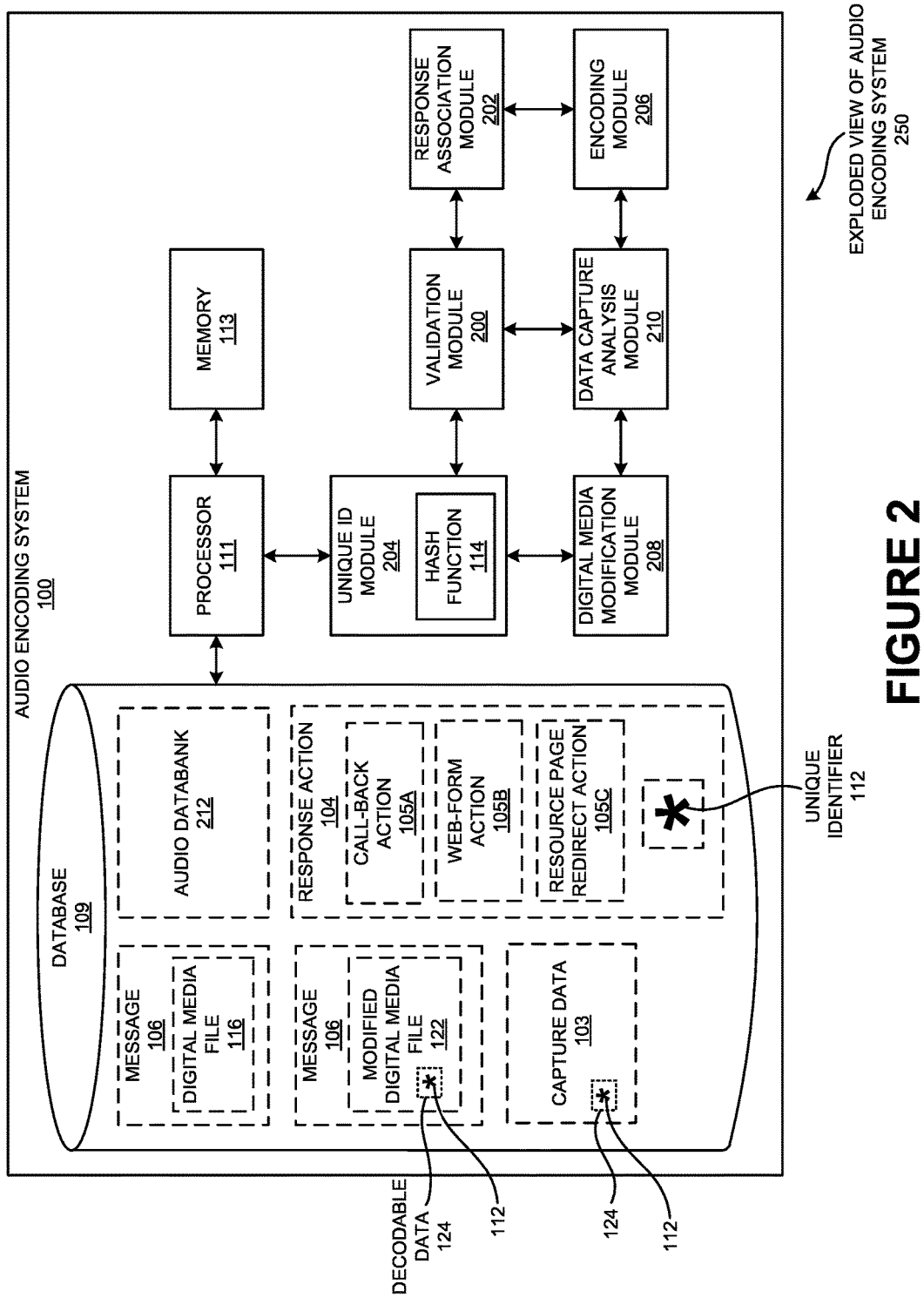
FIG. 2 is an exploded view of the audio encoding system, according to one embodiment.

The response action 104 may include a unique identifier 112 generated by hash function 114 (as shown and described in conjunction with FIG. 2) and the Unique ID module 204 (as shown and described in conjunction with FIG. 2).

The response action 104 may be transmitted along path 'circle 6' through the network 101 to the mobile device 134. For example, the response action 104 may be in the form of the web-form action 105B that upon arriving at the mobile device 134 may display survey fields to the client user 107 within the client application 132.

It should be appreciated that the audio encoding system 100 may be two separate systems, one that may generate the modified digital media file 122 bearing the decodable data 124 from the digital media file 116 and another that generate the appropriate response 104 from the capture data 103 transmitted from the client user 107's mobile device 134.

FIG. 2 is an exploded view of the audio encoding system 250, according to one embodiment.

Particularly, FIG. 2 further illustrates a hash function 114, a validation module 200, a response module 202, a unique ID module 204, an encoding module 206, a digital medial modification module 208, a data-capture module 210, and an audio databank 212.

In FIG. 2, the validation module 200 may validate a user of the audio encoding system as a publisher. For example, the validation module may determine that the user of the audio encoding system is associated with a publisher (e.g., an advertiser).

The response association module 202 may associate the response action 104 to the message of the user 106. The response association module 202 may also associate the response action 104 with the unique identifier 112.

The unique ID module 204 may include a hash function 114. The Unique ID module 204 may generate the unique identifier 112 through the hash function 114 applied to the response action associated with the message 106 of the user 102.

The encoding module 206 may encode the digital media file 116 associated with the message 106 with the decodable data 124 using the unique identifier 112 such that the decodable data 124 is indistinguishable from a primary audio stream 118 through a human ear.

The digital media modification module 208 may generate the modified digital media file 122 associated with the digital media file 116 based on the encoding of the message 106 with the decodable data 124 such that the decodable data 124 is indistinguishable from a primary audio stream 118 through the human ear.

The data capture module analysis module 210 may analyze the capture data 103 such that the client user 107, the decodable data 124, the unique identifier 112, and/or metadata (e.g., a time stamp, a geospatial location, a set of user preferences) may be extracted and compared to data within the database 109 to generate the response action 104.

The database 109 may store the message 106 which includes the digital media file 116, the message 106 which includes the modified digital media file 122 bearing the decodable data 124, the capture data 103, the response actions 104 (including data associated with the correct execution, presentation and display of the call-back action 105A, the web-form action 105B, and the resource page redirect action 105C on the client application 132 of the mobile device 134). The database 109 may also store the audio databank 212 which may include decodable data 124, digital media files 116, and modified digital media files 122.

Figure 3:
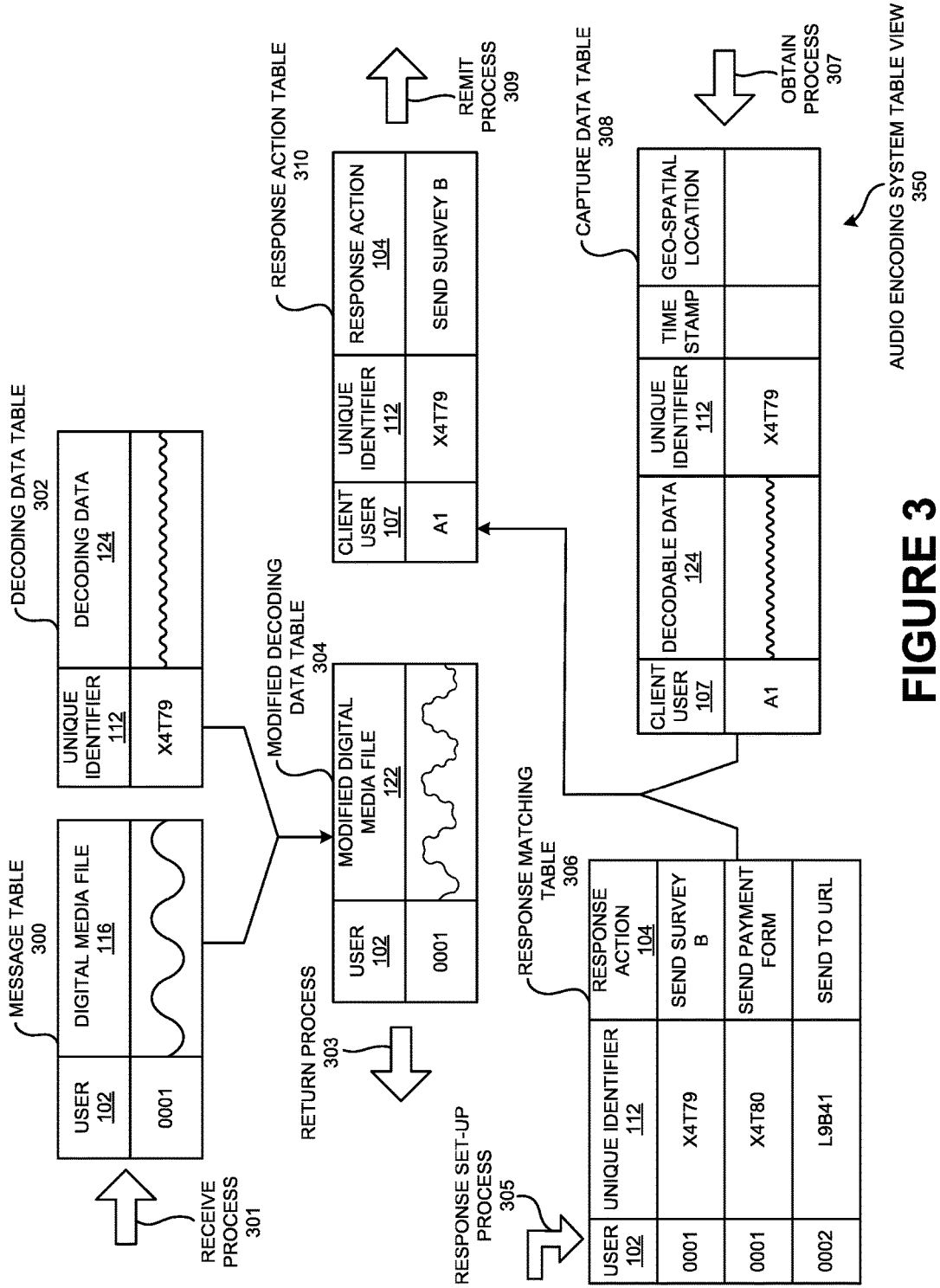
FIG. 3 is a table view of a database that may store a message in the audio encoding system, according to one embodiment.

FIG. 3 is an audio encoding system table view 350 of a database that may store a response action in the audio encoding system, according to one embodiment.

Particularly, FIG. 3 further illustrates a message table 300, a receive process 301 whereby the user provides the digital media file 116, a decoding data table 302, a return process 303 whereby the modified digital media file 122 is returned to the user 102, a modified decoding data table 304, a response set-up process 305 whereby the user 102 may modify the response action 104, a response matching table 306, an obtain process 307, a capture data table 308, a remit process 309, and a response action table 310.

The audio encoding system 100 may receive the digital media file 116 from the user 102 in the form of a message table 300 by the receive process 301 (e.g., physically conveyance to the audio encoding system 100, uploaded in an mp3 or m4a over the network 101). The digital media file 116 may be modified using a decoding data table 302 which includes decodable data 124 and a unique identifier 112. The resulting modification may give rise to the modified recording data table 304 which may include the information identifying user 102 and may include the modified digital media file 122. The modified digital media file 122 may then be returned to the user 102 by the return process 303 (e.g., physically conveyance to the user 102, downloading an mp3 or m4a over the network 101).

The user 102 may modify the response matching table 306 through the response set-up process 305 (e.g., logging into a browser-based application to access the database 109 of the audio encoding system 100). The response matching table 306 may include the identifying information for the user 102, the unique identifier 112, and/or the response action 104.

The capture data table 308 may be sent to the audio encoding system 100 through the obtain process 307 (e.g., the mobile device 134 sending and/or uploading the capture data 103 through the network 101). The capture data table may include information identifying the client user (e.g., a unique user identification, a login name, an email address, a phone number), the decodable data 124, the unique identifier 112, and metadata (e.g., a time stamp associated with the creation of the capture data 103, a geospatial location associated with the creation of the capture data 103).

The audio encoding system 100 may compare the unique identifier 112 in the capture data table 308 to the unique identifies 112 in the response matching table 306. The audio encoding system 100 may then generate the response action table 310 if a match is found between the unique identifier 112 of the capture data table 308 and the other unique identifier 112 of the response matching table 306. The response action table 310 may contain information identifying the client user 107, the unique identifier 112, and the response action 104 which was associated with the unique identifier 112 during the response set up process 305.

The response action table 310 may be sent as the response data 104 to the mobile device 134 of the client user 107 by the remit process 309 (e.g., sending through the network 101).

Figure 4:
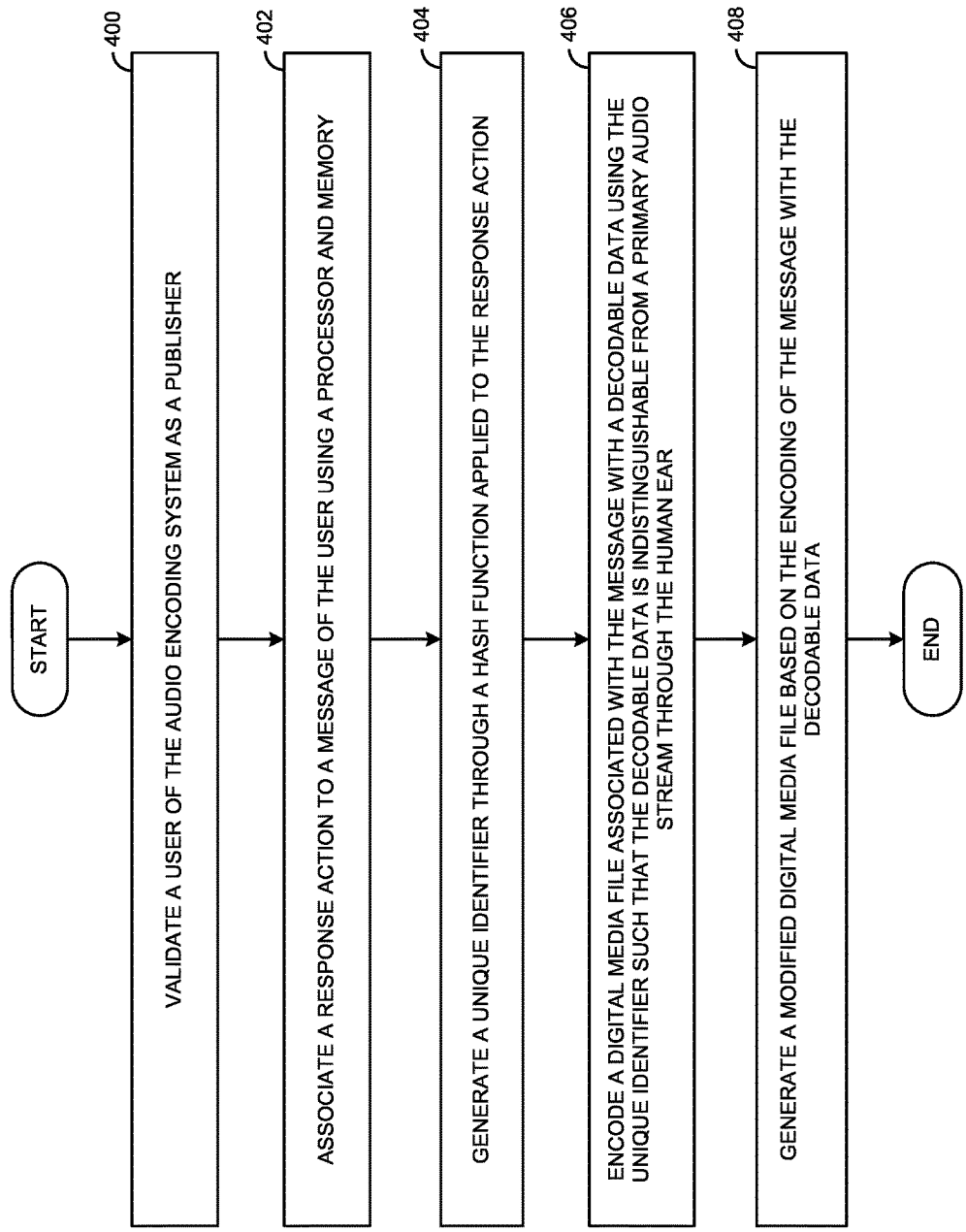
FIG. 4 is a graphical process flow illustrating an encoding process, according to one embodiment.

FIG. 4 is a graphical process flow illustrating an encoding process, according to one embodiment. In step 400, the user 102 may be validated as a publisher (e.g., someone who creates a creative content associated with an advertisement and/or the message 106 of a display at a museum 108 and/or a retail store 110). In step 402, the response action 104 (e.g., may be based on a preset group of templates) may be associated to the message 106 of the publisher using the processor 111 and the memory 113. In step 404, the unique identifier 112 may be generated through the hash function 114 applied to the response action 104 (e.g., may be based on a preset group of templates). In step 406, the message 106 associated with the publisher may be encoded the digital media file 116 associated with the message 106 with the decodable data 124 using the unique identifier 112 such that the decodable data 124 is indistinguishable from the primary audio stream 118 through a human ear. In step 408, the modified digital media file 122 associated with the digital media file 116 may be generated based on the encoding of the message 106 with the decodable data 124 such that the decodable data 124 is indistinguishable from a primary audio stream 118 through the human ear 120.

Figure 5:
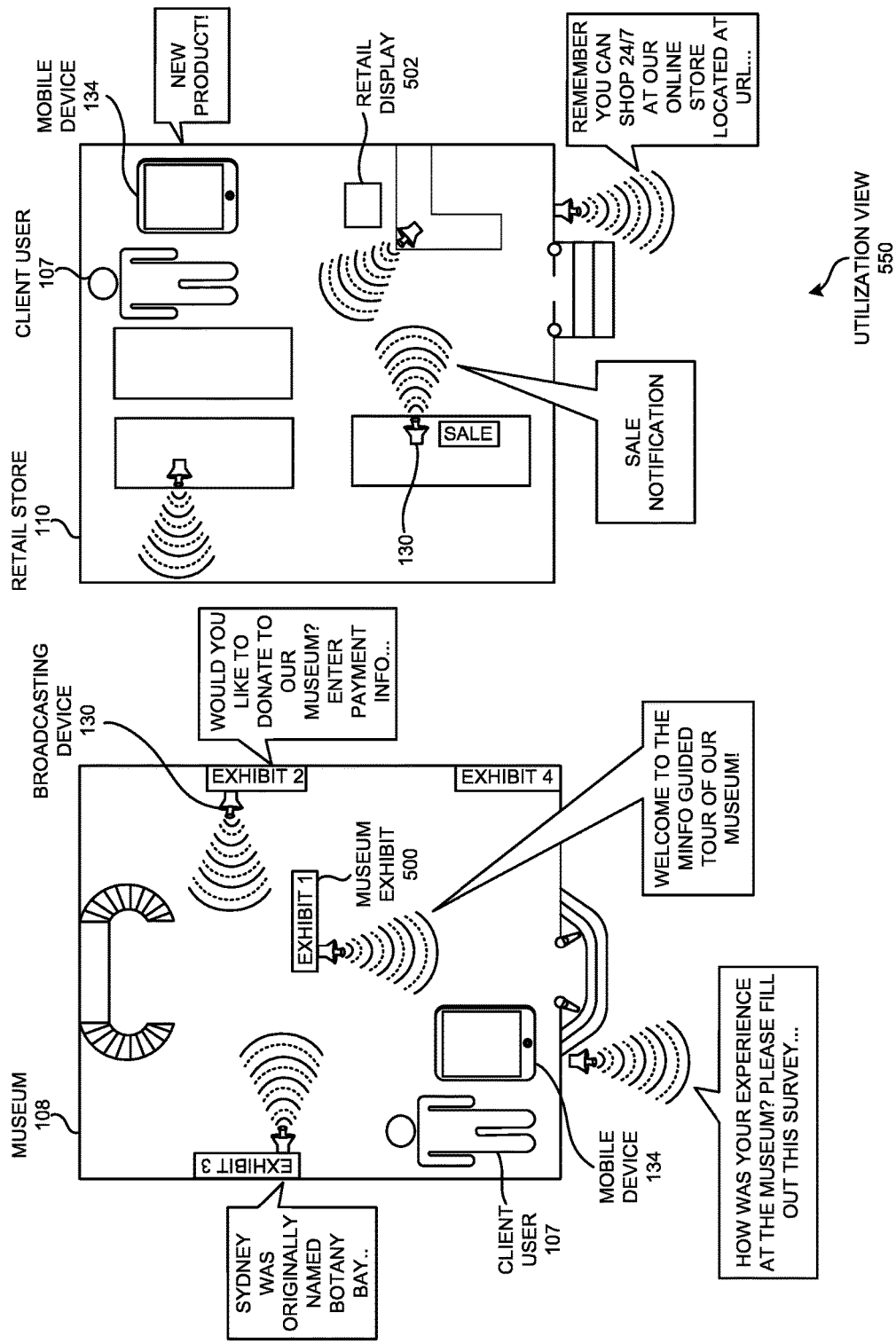
FIG. 5 is a utilization view in which a museum and a retail store utilize the various embodiments described herein to communicate additional messages through the audio encoding system to recipients, according to one embodiment.

FIG. 5 is a utilization view 550 in which a museum and a retail store utilize the various embodiments described herein to communicate additional messages through the audio encoding system to recipients, according to one embodiment.

Particularly, FIG. 5 further illustrates a museum 108, a retail store 110, a museum exhibit 500, and a retail display 502.

In FIG. 5, a client user 107 may decide to visit the museum 108 (e.g., a botanical garden, the Smithsonian Institute, a historical landmark, a national park, a temple, a cathedral, an art installation, a gallery) with his or her mobile device 134. The museum 108 may include multiple exhibits 500. A broadcasting device 130 may be associated with each museum exhibit 500 such that the broadcasting device 130 may emit the encoded audio stream 126, the ultrasound audio stream 117, the primary audio stream 118, the inaudible frequency 129, and/or the audible frequency 128. The client user 107 may use his mobile device 134 to capture analogue data 136 that may be associated with the encoded audio stream data 126. After communication with the audio encoding system through the network 101, the response action 104 may reach the client application 132 on the mobile device 134. For example, in the educational museum context, the response action 104 may include webpages built by the museum to explain the exhibit 500, may send a form soliciting feedback one the client user 107's experience in the museum, and/or send a form soliciting a donation from the client user 107. The primary audio stream 118 may be very soft are almost completely silent as to prevent disturbance of patrons in the museum. A graphical symbol on the exhibit may alert patrons when they are within range the of encoded audio stream.

In FIG. 5 the client user 107 using the mobile device 134 may also read encoded audio streams 126 in the retail store 110 (e.g, a mall, a grocery store, a pharmacy, a department store). For example, the broadcasting device 130 may be associated with a retail display 502, which may promote sale items, featured products, or new goods. The broadcasting device 130 may also be located outside the retail store 110 such that people passing by may acquire the response action 104 without entering the retail store 110. For example, the exterior broadcasting device 130 may play the encoded audio stream 126 associated with the response action 104 of sending the resource page redirect action 105B for webpages associated with the retail establishment 110 that list upcoming discounts, new products that may soon be in stock and/or a URL to an online store.

In one embodiment, a method of an audio encoding system 100 includes validating a user 102 of the audio encoding system 100 as a publisher (e.g., someone who creates a creative content associated with an advertisement and/or a message 106 of a display at a museum 108 and/or a retail store 110), associating a response action 104 (e.g., may be based on a preset group of templates) to a message 106 of the publisher (e.g., someone who creates a creative content associated with an advertisement and/or a message 106 of a display at a museum 108 and/or a retail store 110), the response action 104 (e.g., may be based on a preset group of templates) is a call-back action 105A (e.g., such that a mobile device 134 automatically dials an advertiser), a web-form action 105B (e.g., to enable a respondent to fill out a survey), and/or a resource-page redirect action 105C (e.g., to redirect to a user to a different webpage) using a processor and a memory, generating a unique identifier 112 through a hash function 114 applied to the response action 104 (e.g., may be based on a preset group of templates) associated with the message 106 of the publisher (e.g., someone who creates a creative content associated with an advertisement and/or a message 106 of a display at a museum 108 and/or a retail store 110), encoding a digital media file 116 associated with the message 106 with a decodable data 124 using the unique identifier 112 such that the decodable data 124 is indistinguishable from a primary audio stream 118 through a human ear 120, and generating a modified digital media file 122 associated with the digital media file 116 based on the encoding of the message 106 with the decodable data 124 such that the decodable data 124 is indistinguishable from a primary audio stream 118 through the human ear 120.

The decodable data 124 may be an encoded audio stream 126 at an audible frequency 128 or an ultrasound audio stream 127 that may be at an inaudible frequency 129. The modified digital media file 122 may be communicated from a broadcasting device 130 to a client application 132 of a mobile device 134 as an analog data 136. The client application 132 may identify the modified digital media file 122 through an analysis of the analog data 136. The client application 132 may separate the modified digital media file 122 into the digital media file 116 and the decodable data 124.

The client application 132 may analyze the decodable data 124 using an algorithm that results in a extraction of the unique identifier 112 and the response action 104 (e.g., may be based on a preset group of templates) associated with the message 106 of the publisher (e.g., someone who creates a creative content associated with an advertisement and/or a message 106 of a display at a museum 108 and/or a retail store 110) from the decodable data 124. The client application 132 may be redirected to an internet protocol address based on the response action 104 (e.g., may be based on a preset group of templates).

The mobile device 134 may perform the response action 104 (e.g., may be based on a preset group of templates) comprising the call-back action 105A (e.g., such that a mobile device 134 automatically dials an advertiser), the web-form action 105B (e.g., to enable a respondent to fill out a survey), and/or the resource-page redirect action 105C (e.g., to redirect to a user to a different webpage) based on an instruction at the internet protocol address to which the client application 132 may be redirected. The publisher (e.g., someone who creates a creative content associated with an advertisement and/or a message 106 of a display at a museum 108 and/or a retail store 110) may be an advertiser (e.g., the user 102 may be the advertiser), and the message 106 may be an advertisement associated with a promotion (e.g., the message 106 may be the advertisement and/or the promotion) offered by the advertiser. In addition, the message 106 an explanation associated with a display a museum 108 or a retail store 110.

In another embodiment method of a mobile device 134 includes analyzing a modified digital media file 122 communicated from a broadcasting device 130 to a client application 132 of the mobile device 134 as an analog data 136 using a processor and a memory of the mobile device 134, identifying the modified digital media file 122 through the analysis of the analog data 136, separating the modified digital media file 122 into a digital media file 116 and a decodable data 124, and analyzing the decodable data 124 using an algorithm that results in a extraction of a unique identifier 112 and a response action 104 (e.g., may be based on a preset group of templates) associated with a message 106 of a user 102 of an audio encoding system 100 from the decodable data 124.

In yet another embodiment, a system includes an audio encoding system 100, a broadcasting device 130, and a mobile device 134. In this embodiment, the audio encoding system 100 generates a modified digital media file 122 associated with a digital media file 116 based on an encoding a message 106 with a decodable data 124 such that the decodable data 124 is indistinguishable from a primary audio stream 118 through a human ear 120. In addition, the broadcasting device 130 distributes the modified digital media file 122. In addition, the mobile device 134 analyzes the decodable data 124 using an algorithm that results in a extraction of a unique identifier 112 and a response action 104 (e.g., may be based on a preset group of templates) associated with a message 106 of a user 102 of the audio encoding system 100 from the decodable data 124.

Outbound messages may be delivered via any media end, leaving the receiving consumer to either take action immediately and/or determine to remember to take action at some future point. However, each message may be followed by another message diverting and distracting them, people are busy and their recall quickly dissipates away as time elapses beyond the message, they may forget the message and the offer and to take action. As a result, the marketer's message may not deliver a response from the maximum potential number of consumers who had an initial interest in and intent to respond to the message and its offer. In addition, marketers may have inaccurate and often ill-defined response and effectiveness data regarding the medium in which they may invest to disseminate their message.

By connecting a medium-appropriate 'signifier' to a message that can be recognized by an application installed on a mobile device 134 that can correlate the unique signifier with specific campaign content. Campaigns can be simply created by a marketer/user in minutes using the developed Platform via a computer interface, delivering these campaigns via a users/consumers mobile device when they see or hear a an audio-embeddable content (e.g., a Minfo® campaign) campaign in Print, billboards, signage, or on Radio, TV, Cinema, YouTube, Pre-roll and/or internet.

The marketer may be able to extend the campaign beyond the finite duration of the initial message/medium and invite interested consumers to 'opt-in' and interact with both the brand and the offer. As a result, consumers who may have adequate interest and who can pro-actively interact and take action via their mobile device, should they wish to do so. The solution may pull forward responses which may otherwise have been lost/not occurred, and may compresses the timeline of interaction with the message through to purchase by enabling the customer at the point of initial interest generated by the ad or message. By putting the means to interact into the consumer's hand via their mobile device, the various embodiments may invite real-time interaction with the message at an impulse.

As result, the various embodiments disclosed herein have the potential to reduce the frequency of messages to generate an equivalent level of commercial revenue. Additionally, as response may be per consumer-specific and interactive with their device, marketers may be able to access accurate and clearly defined response data. As each interaction via the device may recorded, the various embodiments may be able to provide real-time quantitative and qualitative response data relating to the effectiveness of their communications campaign strategies and investment decisions.

Push frequency to create recall of the ad and the offer, inclusion of specific campaign inclusions and details to measure response volume on an A/B split testing basis, repetition of and stress on the call to action e.g., 'Call Now', Hurry Stocks Are Limited" etc. However, this may not really enabling a user/consumer to immediately take action. Development of Database to allow the creation, deployment and logging of interaction of each and every campaign is disclosed according to one embodiment. Technology to encode audio files and assigning unique codes to each QR code is disclosed according to one embodiment.

Technology to encode ultrasound into audio files and assigning unique codes to each QR is disclosed according to one embodiment. Technology for creation of QR codes and assigning unique codes to each QR code is disclosed according to one embodiment. Development of IOS, Android and WIN mobile device platforms is disclosed according to one embodiment. Integration with IOS, Android and WIN utilities such as mapping, calendars, SMS etc. is disclosed according to one embodiment. Development of reporting and analytical tools according to one embodiment.

For example, Bob Jones may download an application (e.g., a Minfo® application—the client application 132) on his Apple iPhone® (e.g., the mobile device 134). Then, Bob may listen to an advertisement during his favorite soccer match between Australia and New Zealand. Bob may access a promotional item associated with the advertisement for Zops Detergent automatically when the application on his Apple iPhone® detects a decodable data (e.g., the decodable data 124) in a modified digital media file (e.g., the Zops Detergent advertisement). Then, the application (e.g., the client application 132) may automatically call Zop's detergent's survey hotline (e.g., the response data associated with the decodable data may be a call-back number).

In addition, a web page may automatically open up through which Bob can get the $20 coupon for a six pack of Zops laundry detergent. Bob may be delighted that he was able to quickly respond to an advertisement he just heard in a low friction manner, with no searching or interruption to his viewing of the Australia vs. New Zealand match. Bob may be further delighted when Australia wins the match, and he sees a free t-shirt offer automatically pop up on the application (e.g., the client application 132) when a promotional Australia t-shirt is offered in an ultrasound signal associated with the game ending.

Bob's mobile device (e.g., the mobile device 134) may be able to hear acoustical ranges beyond that of a human ear. Through the application, Bob's mobile device is aware of how to interpret indistinguishable to a human ear audio data. Similarly, Zops laundry detergent (e.g., a merchant) may now communicate advertisements to customers through the application (e.g., the client application 132), according to one embodiment. Zops may not need to annoy customers with audible advertisements that speak aloud to customers (e.g. as they pass by in an isle), or include store-wide sound dispersal of an advertisement (e.g. PA announcements of on sale items) both of which may have annoyed otherwise loyal Zops customers.

Zops, which may already communicating with potential customers through visual or audible mediums (e.g. a television commercial, a radio program, a billboard on the freeway), may now be able to connect with customers because their advertisement lasts longer for potential customers to remember brand names or product names through the application (e.g., the client application 132).

During regular programming of entertainment media (e.g. television shows, on-demand movies, online videos, radio programming, etc.) Zop may now be able to relay their message because it will not interrupt the program for potential customers having the application (e.g., the client application 132) installed on their mobile devices (e.g., the mobile device 134). Therefore, a potentially valuable connection may be formed between Zops and customers like Bob Jones.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or Digital Signal Processor (DSP) circuitry).

In addition, it will be appreciated that the various operations, processes, and methods disclosed herein may be embodied in a machine-readable medium and/or a machine accessible medium compatible with a data processing system. Accordingly, the specification and drawings are to be regarded in an illustrative rather than a restrictive sense.

What is claimed is:

1. A method comprising:

validating, through an audio encoding system, a user of the audio encoding system as a publisher of a message as a digital media file;

encoding, through the audio encoding system, the digital media file associated with the message with decodable data using a unique identifier, the decodable data in one instance being an audio stream at a frequency audible to a human ear and in another instance being an audio stream at an ultrasound frequency inaudible to the human ear;

generating, through the audio encoding system, a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear;

capturing, through a client application of a mobile device of a client user, the modified digital media file playing on a broadcasting device to generate capture data therefrom based on metadata associated with the mobile device, the metadata being one of: a timestamp, a geospatial location, a set of user preferences and a set of advertising histories;

generating, through the audio encoding system, a response action of the client user based on analyzing the capture data from the mobile device to extract elements therefrom and comparing the extracted elements to data stored in a database;

associating, through a processor and a memory of the audio encoding system, the response action of the client user in an interactive form to the message of the publisher, wherein the response action is at least one of a call-back action, a web-form action, and a resource-page redirect action for the client application of the mobile device of the client user, the call-back action being triggering of a phone call to the publisher via a user interface of the client application, the web-form action being display of a set of forms chosen by the publisher on the user interface of the client application, and the resource-page redirect action being display of a webpage through at least one of: the user interface of the client application and a browser of the mobile device;

generating, through the audio encoding system, the unique identifier through a hash function applied to the response action associated with the message of the publisher;

automatically interpreting, through the client application, the modified digital media file in both the one instance and the another instance to decode the decodable data therein; and enabling, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user.

2. The method of claim 1, further comprising:

communicating the modified digital media file from the broadcasting device to the client application of the mobile device as an analog data; and acquiring, through the client application, the captured modified digital media file through an analysis of the analog data.

3. The method of claim 2, further comprising:

separating, through the client application, the captured modified digital media file into a captured digital media file and a captured decodable data.

4. The method of claim 3, further comprising:

analyzing, through the client application, the captured decodable data using an algorithm that results in an extraction of the unique identifier and the response action associated with the message of the publisher from the captured decodable data.

5. The method of claim 1, further comprising:
redirecting the client application of the mobile device of the client user to an internet protocol address based on the response action being the resource-page redirect action.

6. The method of claim 5, comprising:
performing, through the mobile device, the response action comprising the at least one of the call-back action, the web-form action, and the resource-page redirect action based on an instruction at the internet protocol address to which the client application is redirected.

7. The method of claim 1:
wherein the publisher is an advertiser, and
wherein the message is at least one of an advertisement associated with a promotion offered by the advertiser and an explanation associated with a display of at least one of a museum and a retail store.

8. A method comprising:
validating, through an audio encoding system, a user of the audio encoding system as a publisher of a message as a digital media file, the publisher being a creator of creative content associated with the message;
encoding, through the audio encoding system, the digital media file associated with the message with decodable data using a unique identifier, the decodable data in one instance being an audio stream at a frequency audible to a human ear and in another instance being an audio stream at an ultrasound frequency inaudible to the human ear;
generating, through the audio encoding system, a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear;
capturing, through a client application of a mobile device of a client user, the modified digital media file playing on a broadcasting device to generate capture data therefrom based on metadata associated with the mobile device;
generating, through the audio encoding system, a response action of the client user based on analyzing the capture data from the mobile device to extract elements therefrom and comparing the extracted elements to data stored in a database;
associating, through a processor and a memory of the audio encoding system, the response action of the client user in an interactive form to the message of the publisher, wherein the response action is at least one of a call-back action, a web-form action, and a resource-page redirect action for the client application of the mobile device of the client user, the call-back action being triggering of a phone call to the publisher via a user interface of the client application, the web-form action being display of a set of forms chosen by the publisher on the user interface of the client application, and the resource-page redirect action being display of a webpage through at least one of: the user interface of the client application and a browser of the mobile device;
generating, through the audio encoding system, the unique identifier through a hash function applied to the response action associated with the message of the publisher;
automatically interpreting, through the client application, the modified digital media file in both the one instance and the another instance to decode the decodable data therein; and
enabling, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user.

9. The method of claim 8, further comprising:
communicating the modified digital media file from the broadcasting device to the client application of the mobile device as an analog data; and
acquiring, through the client application, the captured modified digital media file through an analysis of the analog data.

10. The method of claim 9, further comprising:
separating, through the client application, the captured modified digital media file into a captured digital media file and a captured decodable data.

11. The method of claim 10, further comprising:
analyzing, through the client application, the captured decodable data using an algorithm that results in an extraction of the unique identifier and the response action associated with the message of the publisher from the captured decodable data.

12. The method of claim 8, further comprising:
redirecting the client application of the mobile device of the client user to an internet protocol address based on the response action being the resource-page redirect action.

13. The method of claim 12, comprising:
performing, through the mobile device, the response action comprising the at least one of the call-back action, the web-form action, and the resource-page redirect action based on an instruction at the internet protocol address to which the client application is redirected.

14. The method of claim 8:
wherein the publisher is an advertiser, and
wherein the message is at least one of an advertisement associated with a promotion offered by the advertiser and an explanation associated with a display of at least one of a museum and a retail store.

15. A system comprising:
a mobile device of a client user, and
an audio encoding system:
to validate a user of the audio encoding system as a publisher of a message as a digital media file,
to encode the digital media file associated with the message with decodable data using a unique identifier, the decodable data in one instance being an audio stream at a frequency audible to a human ear and in another instance being an audio stream at an ultrasound frequency inaudible to the human ear, and
to generate a modified digital media file from the digital media file based on the encoding of the digital media file associated with the message with the decodable data such that an audio stream associated with the modified digital media file encoded with the decodable data is interpretably indistinguishable from a primary audio stream associated with the digital media file through the human ear, wherein the mobile device is configured to capture, through a client application thereof, the modified digital media file playing on a broadcasting device to generate capture data therefrom based on metadata associated with the mobile device, the metadata being one of: a timestamp, a geospatial location, a set of user preferences and a set of advertising histories, wherein the audio encoding system is further configured:
    to generate a response action of the client user based on analyzing the capture data from the mobile device to extract elements therefrom and comparing the extracted elements to data stored in a database,
    to associate, using a processor and a memory, the response action of the client user in an interactive form to the message of the publisher, wherein the response action is at least one of a call-back action, a web-form action, and a resource-page redirect action for the client application of the mobile device of the client user, the call-back action being triggering of a phone call to the publisher via a user interface of the client application, the web-form action being display of a set of forms chosen by the publisher on the user interface of the client application, and the resource-page redirect action being display of a webpage through at least one of: the user interface of the client application and a browser of the mobile device, and
    to generate the unique identifier through a hash function applied to the response action associated with the message of the publisher, and wherein the client device is further configured:
    to automatically interpret, through the client application, the modified digital media file in both the one instance and the another instance to decode the decodable data therein, and
    to enable, through the client application, the client user to initiate the response action in the interactive form to the message of the publisher without interrupting an experience of concurrent sensing of media content through the broadcasting device by the client user in accordance with the automatic interpretation of the modified digital media file and the association of the response action, the message accompanying the media content being sensed by the client user.

16. The system of claim 15:

wherein the modified digital media file is communicated from the broadcasting device to the client application of the mobile device as an analog data, and wherein the mobile device is further configured to acquire, through the client application, the captured modified digital media file through an analysis of the analog data.

17. The system of claim 16, wherein the mobile device is further configured to separate, through the client application, the captured modified digital media file into a captured digital media file and a captured decodable data.

18. The system of claim 17, wherein the mobile device is further configured to analyze, through the client application, the captured decodable data using an algorithm that results in an extraction of the unique identifier and the response action associated with the message of the publisher from the captured decodable data.

19. The system of claim 15, wherein the client application of the mobile device of the client user is redirected to an internet protocol address based on the response action being the resource-page redirect action.

20. The system of claim 15:

wherein the publisher is an advertiser, and wherein the message is at least one of an advertisement associated with a promotion offered by the advertiser and an explanation associated with a display of at least one of a museum and a retail store.

\* \* \* \* \*